US007779059B2

(12) United States Patent
Bourland, II et al.

(10) Patent No.: US 7,779,059 B2
(45) Date of Patent: Aug. 17, 2010

(54) GEOCODING AND ADDRESS HYGIENE SYSTEM EMPLOYING POINT LEVEL AND CENTERLINE DATA SETS

(75) Inventors: Freddie J. Bourland, II, Longmont, CO (US); Kevin F. Cartin, Boulder, CO (US); Berkley R. Charlton, Frederick, CO (US); Stephen B. Kinsch, Nederland, CO (US); Catherine J. Loher, Arvada, CO (US); Bryan D. Sears, Longmont, CO (US); Stephen C. Walden, Longmont, CO (US)

(73) Assignee: Pitney Bowes Software Inc., Lanham, MD (US)

( * ) Notice: Subject to any disclaimer, the term of this patent is extended or adjusted under 35 U.S.C. 154(b) by 1237 days.

(21) Appl. No.: 11/317,503

(22) Filed: Dec. 22, 2005

(65) Prior Publication Data

US 2007/0156753 A1   Jul. 5, 2007

(51) Int. Cl.
*G06F 17/30* (2006.01)
(52) U.S. Cl. .................................................. 707/919
(58) Field of Classification Search ................ 707/802, 707/919, 999.006, 999.1, 999.107
See application file for complete search history.

(56) References Cited

U.S. PATENT DOCUMENTS

| 6,907,424 B1 | 6/2005 | Neal et al. ...................... 707/3 |
| 2004/0215607 A1 | 10/2004 | Travis, Jr. ...................... 707/3 |
| 2005/0251331 A1* | 11/2005 | Kreft ........................... 701/207 |
| 2007/0088897 A1* | 4/2007 | Wailes et al. .................... 711/3 |

OTHER PUBLICATIONS

"Improving Geocoding Practices: Evaluation of Geocoding Tools" by D-H Yang et al. Journal of Medical Systems, Kluwer Academic Publishers—Plenum Publishers, NE. vol. 28, No. 4, Aug. 1, 2004, pp. 361-370, XP019283403. ISSN: 1573-689X.
"Point Level Geocoding in Group 1 Product", by Nora Parker. Directions Magazine, Sep. 3, 2005, pp. 1-3. XP002433133.

* cited by examiner

*Primary Examiner*—Cheryl Lewis
(74) *Attorney, Agent, or Firm*—Michael J. Cummings; Angelo N. Chaclas

(57) ABSTRACT

A method for processing two different types of geographic address data sets to establish candidate matched data includes entering address data into the system and accessing a point level address data set. A determination is made if the point level data set contains an exact match to the entered address data. Any exact address data match from the point level data set is output. Candidate address data matches from the point level data set are saved when no exact match is determined as existing in the point level data set. A centerline address data set is accessed and a determination is made of candidate address data matches from the centerline address data set. Candidate address data from both the point level data set and the centerline data set are scored and matched.

A system for geocoding and address hygiene includes a processing system with an input and an output system coupled to said processing system. A point level data set is coupled to the processing system. A centerline data set is coupled to the processing system. A cascade geocoding scoring and matching engine is coupled to the processing system.

7 Claims, 2 Drawing Sheets

GEOCODING AND ADDRESS HYGIENE SYSTEM EMPLOYING POINT LEVEL AND CENTERLINE DATA SETS

FIELD OF THE INVENTION

The present invention relates to geocoding and address hygiene systems and more particularly to geocoding and address hygiene systems employing point level and centerline data sets which minimizes false positive candidate records from multiple data sources.

BACKGROUND OF THE INVENTION

Systems have been developed that employ two geocoding data sets to attempt to provide the correct latitude and longitude as well as street address for incomplete or inaccurate input data for a specific location. These systems are employed where the geographic location of an address is needed for example to determine if the address is in a flood plain for insurance rating purposes or for directions to the address or for mapping of the address into a locale and, at times, for address hygiene purposes.

The geocoding data sets are processed by a geocoding engine. This is a specialized matching engine that utilizes a textual representation of an address as input. The engine matches the address against a data set of geographic data and uses algorithms to determine the location of the input address. The engine returns the location as a coordinate (longitude-latitude pair) referred to as a geocode and, depending on the system, may also return a more complete and accurate address based on an address hygiene function.

Geocoding data sets used for the above purposes include point level or parcel level geographic data sets and centerline geographic data sets. Point level or parcel level data sets (hereinafter referred to as point level data sets) are data sets where a single latitude and longitude is provided for a specific address. Centerline data sets are data sets where a centerline is provided, such as for a street, and interpolation is employed to relate the centerline to a specific address to establish a single latitude and longitude, from a range of latitude and longitude, for the address.

A street centerline data set usually contains coordinates that describe the shape of each street and the range of house numbers found on each side of the street. The geocoding engine may compute the geocode by first interpolating where the input house number exists within the street address range. The geocoding engine then applies this interpolated percentage to the street centerline coordinates to calculate the location. Finally, the engine offsets this location from the centerline to give an approximate structure location for the input address. Data sets are now also available that consist of point locations for addresses. These point level data sets result in higher quality geocodes than those requiring the interpolation technique. However, these point level data sets often do not contain every address and are therefore incomplete.

The sources of data for centerline and point level address matching have historically come from postal services or from digital map vendors, including census bureaus. The centerline data sets for address matching are largely complete due to their maturity and because they contain ranges of addresses rather than individual addresses. Newer point level data sets contain only one address per record and, as noted above, may not contain all addresses. Point level data sets are generally provided by the same sources as centerline data sources.

A centerline data set generally contains all known addresses within a locale. Because the data set is considered to be complete, the software can determine the best match based on the available records in the data. For example, 1 Elmcroft St. in Stamford, Conn., can be safely matched to 1 Elmcroft Rd. in Stamford, Conn., because the only viable address candidate for Elmcroft St. is Elmcroft Rd. The completeness of the reference data set provides a high level of confidence that Elmcroft St does not exist. Conversely, if the input address is 838 Mesa, Palo Alto, Calif., a match cannot be made if there are two viable candidates, Mesa Ct and Mesa Ave. Neither address candidate can be determined to be a better match.

As noted above, point level geocoding data sets are currently generally incomplete. If only Mesa Ct is present in the point level data set, the software could erroneously match to that record, resulting in a false positive match. Therefore, if the software uses only the point level data, there is a risk of matching to the wrong record (a false positive match). This type of match generally has a lower level of confidence in the accuracy and usually should not be made with the point level data set alone.

Prior efforts to combine centerline data sets and point level data sets have been implemented to attempt to provide an increased level of confidence of having an accurate address match than is provided by either data set alone. Examples of such systems are previous versions of the Centrus GeoStan product and its competitors. In such systems the candidate data records are scored by separate geocoding engines or separate geocoding operations in each data set. Decisions as to the relative likelihood of a correct match for the input data are made without regard to results from the other data set. This results in an increased number of false positive results since the point level data is assumed to be complete. Alternatively, this may result in fewer matches to the point level data than might otherwise be possible if the match logic employed for the point level data is too restrictive.

SUMMARY OF THE INVENTION

It is an object of the present invention to provide a system for combining centerline and point level data sets for geocoding and/or address hygiene purposes.

It is a further object of the present invention to provide a system for combining centerline and point level data for processing in a way that minimizes false positive candidate data records output when attempting to correlate an input address data record to stored address data records in the two data sets.

A method for processing two different types of geographic address data sets to establish candidate matched data embodying the present invention includes the steps of entering address data into the system and accessing a point level address data set. A determination is made if the point level data set contains an exact match to the entered address data. Any exact address data match from the point level data set is output. Candidate address data matches from the point level data set are saved when no exact match is determined as existing in the point level data set. A centerline address data set is accessed and a determination is made of address candidate data matches from the centerline address data set. Address candidate address data from both the point level data set and the centerline data set are scored and matched to the entered address data.

A system for geocoding and address hygiene embodying the present invention includes a processing system with an input system and an output system. A point level data set is coupled to the processing system. A centerline data set is coupled to the processing system. A cascade geocoding scoring and matching engine is coupled to the processing system.

BRIEF DESCRIPTION OF THE DRAWINGS

Reference is now made to the various figures wherein like reference numerals designate similar items in the various view and in which.

DETAILED DESCRIPTION OF THE PREFERRED EMBODIMENT

Figure 1:
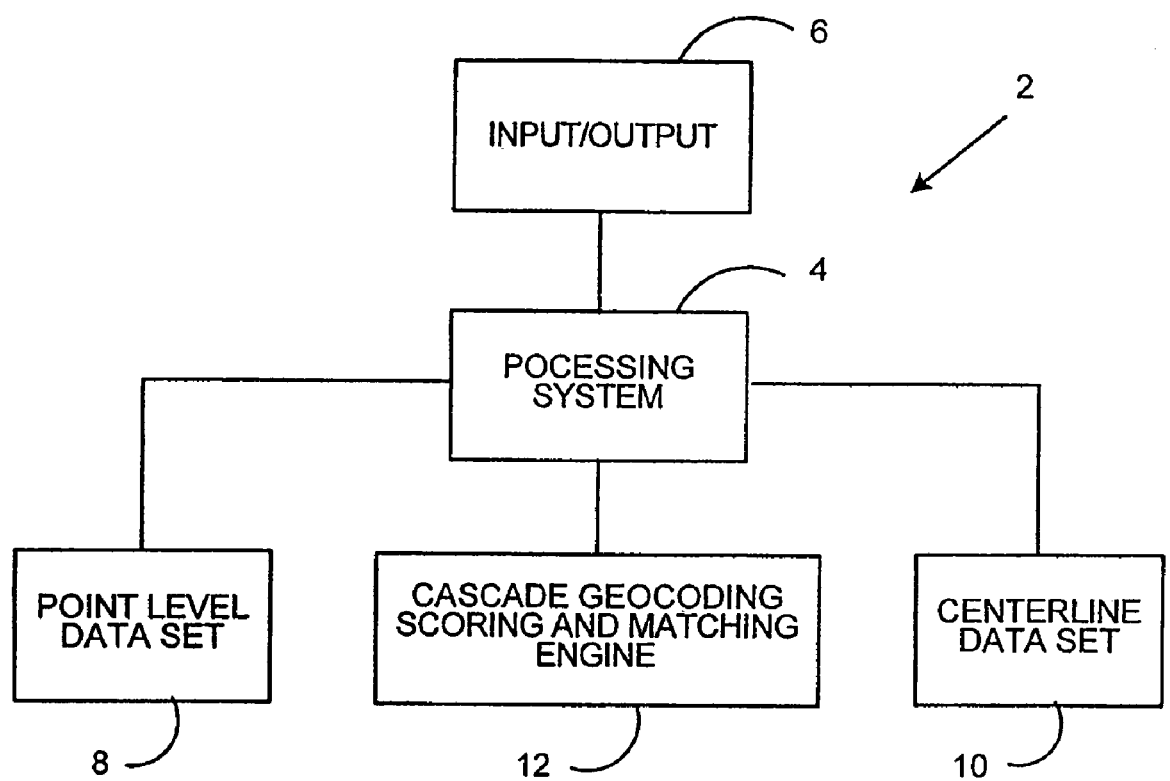
FIG. 1 is a block diagram of a geocoding and address hygiene system embodying the present invention; and, FIG. 2 is a flow chart of the operation of the system shown in FIG. 1.

Reference is now made to FIG. 1. A geocoding and address hygiene system 2 includes a processing system 4. An input/output system 6 is connected to the processing system 4. The input/output system can be of a wide variety of systems enabling the input of data to the processing system 4 and also the output of data by the processing system. The processing system 4 processes data from a point level data set 8 and a centerline data set 10. The data from the data sets 8 and 10 are processed by a cascade geocoding scoring and matching engine 12. The cascade geocoding scoring and geocoding scoring and matching engine 12 is unique in that it compares the input record to the candidate records selected from both the reference data sets (the point level data set 8 and the centerline data set 10) and thereafter selects the best match. The scoring engine examines the input record and the reference record and produces a penalty based score that defines how closely the records resemble each other. A score of zero (0) indicates that the records are an exact match, while higher scores indicate the level and importance of the differences found.

The geocoding scoring and matching engine 12 selects the best match from a set of scored records. In general, the geocoding scoring and matching engine 12 selects the best scoring reference record from the list, but the geocoding scoring and matching engine 12 may reject records in some situations or resolve ties for highest score as described below. The geocoding scoring and matching engine 12 used in this invention first examines the scores of the candidate records found in the point level data set. If an exact match is found on all elements except, if desired, the postal code add on, then the point level match is selected and the centerline data is not examined. The postal code add on, for example, may be a United States Postal Service (USPS) 5 or 9 digit zip code or other type of postal code employed in other countries. However, if no matches or an imperfect match is found, then the candidate records from the centerline data set are selected and scored against the input address. The geocoding scoring and matching engine 12 compares the scores from candidates within both data sets to make its determination. If only one record from the combined candidate set scores better than all others, then the geocoding scoring and matching engine 12 selects that record. If a tie exists among records with the best score, and those records contain the same street and locale information from both the point level data set and the centerline data set, then the geocoding scoring and matching engine 12 gives preference to the record from the point level data set and selects that record for the match. If the best records contain information that is not identical, regardless of which data set the records are from, then a multiple match condition exists, and the geocoding scoring and matching engine 12 returns that information. Finally, if no records meet the match criteria of the geocoding scoring and matching engine 12 then the geocoding scoring and matching engine 12 returns a no match result.

The stored point level data set 8 and the stored centerline data set 10 are each data bases for a geographic area. These generally large data sets may each contain plural data sets for various locales and regions within the geographic area. The processing system 4 can, if desired, be organized to retrieve one or more data set or to process retrieved data and create appropriate point level and centerline data sets for a locale or region from the stored data sets 8 and 10. The retrieved or created data sets from each of the data sets 8 and 10 are the source for the candidate address data for scoring and matching by the cascade geocoding engine 12. This reduces the amount of data that needs to be processed to identify candidate address data for scoring and matching.

The centerline data set may be organized by locale. A locale may represent an administrative region, such as a county or state, or a postal region such as a ZIP Code or Finance Area. A Finance Area is a search area based on a group of zip or other postal codes. Within a locale the data is sorted by street name and the range of house numbers present on the record to enhance search performance. Each record also contains a series of points that describe the shape of the street segment. The point level data base is organized in the same manner, except that high and low values for the address range are identical, and the location information consists of a single point. The system 2 operates in a manner shown by the flow chart of FIG. 2.

Figure 2:
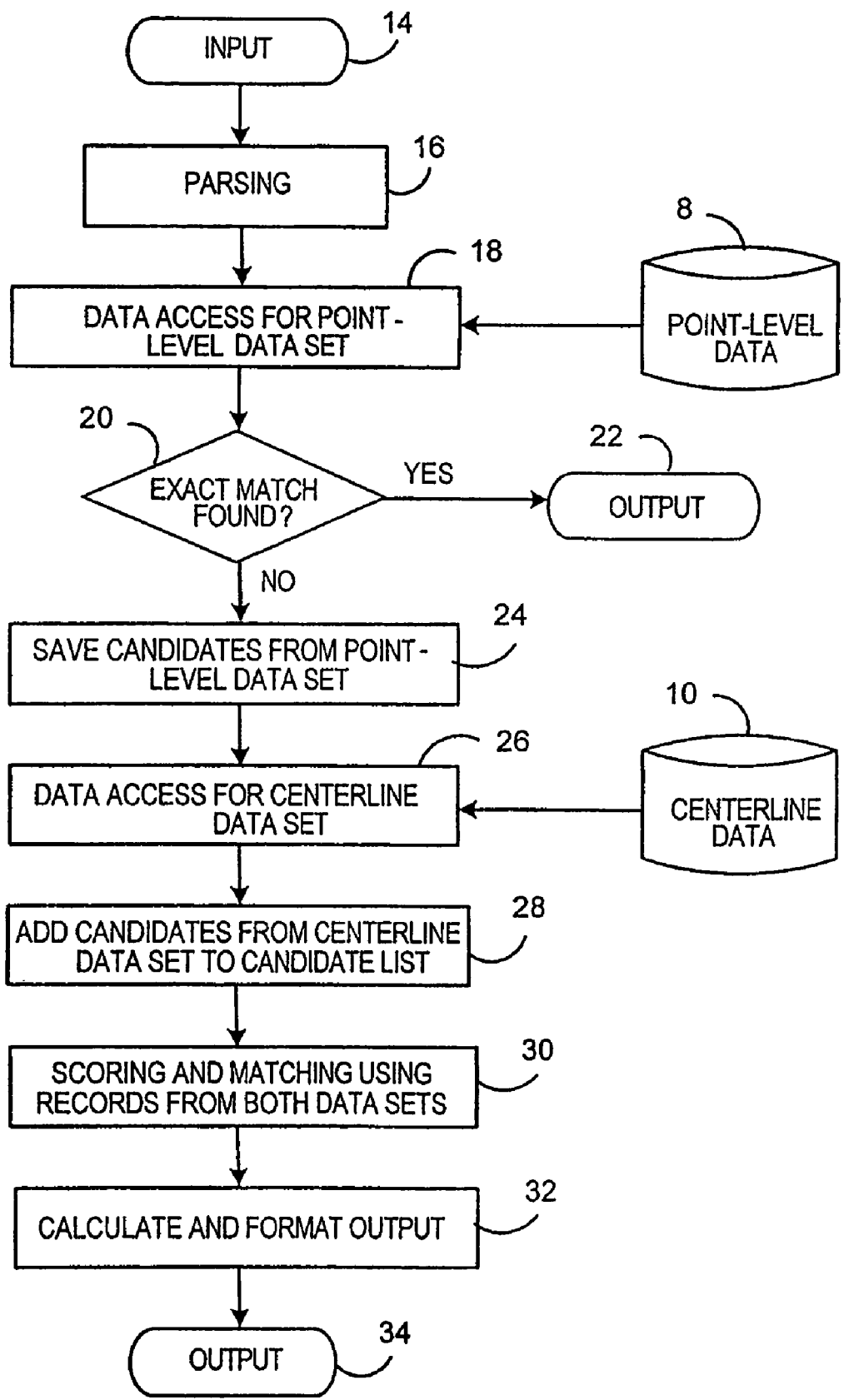

Reference is now made to FIG. 2. Address data is input at 14. The address data may be complete, incomplete or inaccurate and is being processed to obtain a longitude and latitude pair for the address and, if desired, a hygiened address for use, for example, when preparing a mailing.

The address data input at 14 is parsed at 16 so that the address can be compared to data records or files stored in the point level data set 8 and centerline data set 10 to identify candidate address data, if any, in each of the two data sets. At 18, candidate data records are accessed from the point level data set 8. A determination is made at decision block 20 whether any of the candidate data addressed from the point level data set 8 matches the parsed address from the input address data. If an exact match is found at 20, the result is output at 22 and the process may be terminated.

Alternatively, or if no exact match is found at decision block 20, the process continues with candidate address data from the point level data set 8 saved at block 24. At 26, candidate address data is accessed from centerline data set 10. The address data candidate list from the centerline data set 10 is added at block 28 to the address data candidate list from the point level data set 8. Thus, at block 28, all of the address data candidates from both data sets 8 and 10 are available for further processing. At block 30, the address data candidates from both data sets 8 and 10 are scored. Scoring takes into account the differences between the input and reference records. Different weights are assigned to the different portions of the address and types of errors that occur to achieve a score for the reference record. Based on the scoring algorithm and the matching, at block 30, selection is implemented of the most relevant and likely candidate data records. Address data is calculated, formatted and output to block 34 for the selected candidate data records.

Where the scoring and matching results in an equal score and match for address candidates from the point level data set 8 and the centerline data set 10 and the street and locale information contained in both records is identical, the point level data set candidate is given priority and is output at 34.

It should be expressly noted that the scoring and matching is done by a single processing of both candidate address data from the point level data set 8 and the centerline data set 10. By doing so, the number of false positive address candidate data is reduced.

As an example of the above system, the system may consider, score and match, candidate records from both data sets. The input address is 6554 Orion, Arvada, Colo. 80007 and the point level and centerline data sets contains the following candidate records:

6554-6554 ORION CT 80007-6959 (Point level data set)
6518-6598 ORION CT 80007-6959 (Centerline data set)
6500-6599 ORION LN 80007-6976 (Centerline data set)

A match using only the point level data set may result in a false positive match. Whereas a match using the centerline data set may result in additional relevant match candidates. The system described above first attempts to find an exact match (such as pre-directional, street name, street type, post-directional) in the point level data set. If the software finds an exact match, it returns this best address candidate data. For example, if the input address is 6554 Orion Ct, the point level data sets contains the following record:

6554-6554 ORION CT 80007-6959 (Point level data set).

The system will find an exact match in the parcel data set, and returns that address candidate record at block 22 in FIG. 2.

If the system cannot find an exact match in the point level data set, it searches for additional candidate records in the centerline data set, and scores and matches at block 30 in FIG. 2 all of the candidate records from both data sets to find the best match. After analyzing all of the candidate address data, the software returns the best match from either data set.

In some instances, the system may not be able to determine a best match to the input address. If this occurs, the system will return multiple candidate address data. For example, if the input address is 6554 Orion, the system will have candidate address data from both data sets:

6554-6554 ORION CT 80007-6959 (Point level data set)
6518-6598 ORION CT 80007-6959 (Centerline data set)
6500-6599 ORION LN 80007-6976 (Centerline data set)

Since 6554 is possible on both Orion Ct and Orion Ln, the system returns a multiple candidate address data to avoid a false positive match.

It should be noted that the term data as used herein is a broad term. It encompasses both partial and complete records such as partial or complete input address record or candidate address record.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A method for processing two different types of geographic address data sets to establish candidate matched data, comprising the steps of:
    entering address data into the system;
    accessing a point level address data set;
    determining if the point level data set contains an exact match to the entered address data;
    outputting any exact address data match from said point level data set;
    saving candidate address data matches from said point level data set when no exact match is determined as existing in said point level data set;
    accessing a centerline address data set;
    determining address candidate matches from said centerline address data set;
    scoring and matching candidate address data from both said point level data set and said centerline data set to said entered address data;
    outputting candidate address data and outputting only said point level candidate address data set matched to said input address data when said scoring step determines an equal score for candidate address data from said point level data set and from said centerline data set;
    wherein scoring and matching candidate address data from both said point level data set and said centerline data set to said entered address data is implemented in a single geocoding scoring and matching engine.

2. A method as defined in claim 1 comprising the further steps of stopping said process if an exact candidate address data match to said input address data is determined as present in said point level data set and outputting said exact candidate address data.

3. A method as defined in claim 1 comprising the further steps of stopping said process if an exact candidate address data match to said input address data is determined as present in said point level data set and outputting said exact candidate address data.

4. A method as defined in claim 1 comprising the further steps of outputting candidate address data and outputting only said point level candidate address data set match to said input address data when said scoring step determines an equal score for candidate address data from said point level data set and from said centerline data set.

5. A geocoding system comprising:
    a processing system;
    an input and an output system for inputting and outputting data coupled to said processing system;
    a point level data set coupled to said processing system;
    a centerline data set coupled to said processing system; and,
    a cascade geocoding scoring and matching engine coupled to said processing system;
    wherein said processing system is configured to process retrieved data from said point level data set and to retrieve data from said centerline data set to formulate a plurality of data for scoring and matching to input data by said cascade geocoding engine; and
    wherein said processing system is configured to process said point level data set information and said centerline data set information to form a point level data set and centerline data set for a given locale for scoring and matching to said input data by said geocoding engine.

6. A system as defined in claim 5 wherein said input data is address data and said retrieved data from said point level data set and centerline data set is candidate address data to be scored and matched by said cascade geocoding engine to said address data input into said processing system.

7. A system as defined in claim 6 wherein said input address data is formatted to provide a hygiened address based on the scored candidate address data providing the closest match to said input address data.

* * * * *